Oct. 7, 1947.    A. T. SCHEIWER    2,428,637
COUPLING
Filed May 21, 1945
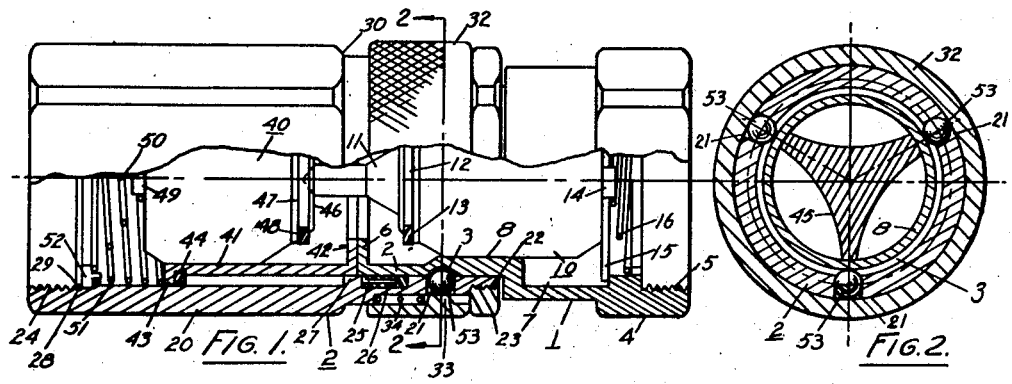
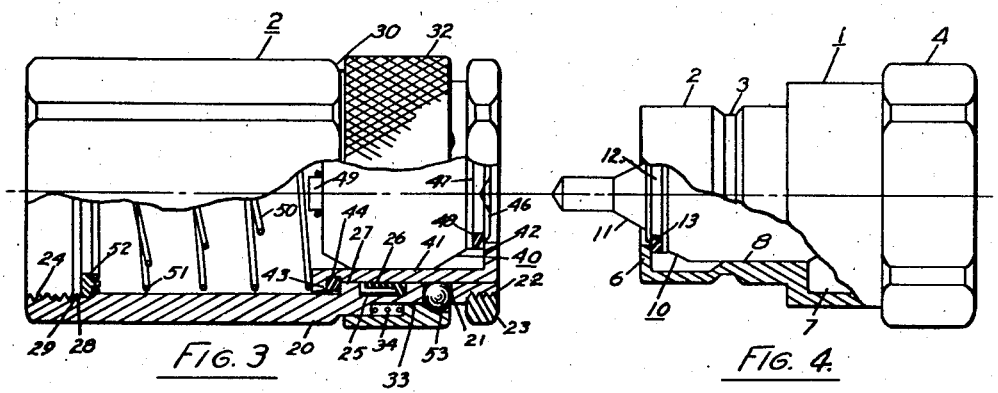
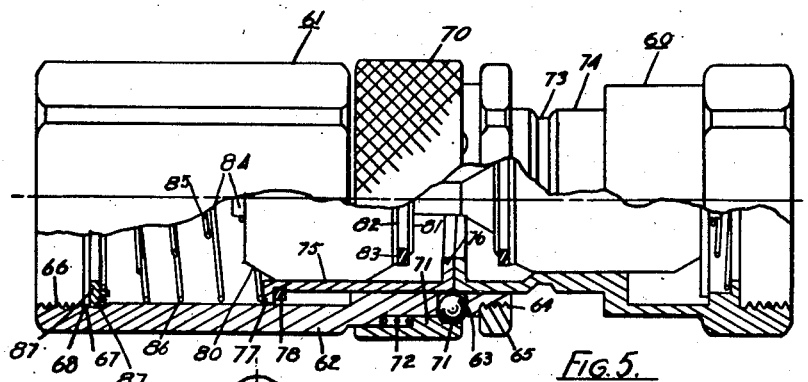
INVENTOR.
Albert T Scheiwer

Patented Oct. 7, 1947

2,428,637

UNITED STATES PATENT OFFICE 2,428,637

COUPLING

Albert T. Scheiwer, Erie, Pa.

Application May 21, 1945, Serial No. 594,927

9 Claims. (Cl. 284—19)

This invention relates generally to couplings and more particularly to ball-type couplings.

Prior couplings with check valves disposed in the male and female members have required movement of a sleeve or the like by manual means to make a connection. This has been found practically impossible with heavy mittens on and it requires too much time and waste of oxygen when a quick connection to an oxygen mask or the like must be made.

It is, accordingly, an object of my invention to provide a quickly attachable and detachable coupling which can be securely connected by merely inserting the male member into the female member and it is more particularly an object of my invention to provide a novel coupling which is simple in construction, economical in cost, economical in manufacture, and efficient in operation.

Another object of my invention is to provide a novel ball-type coupling with a check valve in the male member and the female member thereof which may be connected by merely inserting the male member into the female member.

Another object of my invention is to provide novel means for holding a movable sleeve on a female member of a ball-type coupling in a position to automatically lock the male and female members together upon insertion of the male member into the female member.

Other objects of my invention will become evident from the following detailed description, taken in conjunction with the accompanying drawings, in which Fig. 1 is a side elevational view with parts broken away of my novel coupling in locked position.

Fig. 2 is a view taken on the line 2—2 of Fig. 1.

Fig. 3 is a side elevational view with parts broken away of the female member of my novel coupling when disconnected from the male member.

Fig. 4 is a side elevational view with parts broken away of the male member of my novel coupling when disconnected from the female member.

Fig. 5 is a side elevational view with parts broken away of a modified form of my novel coupling.

Fig. 6 is an end elevational view of the novel coupling shown in Fig. 5.

Referring now to the drawings, Figs. 1, 2, 3, and 4 show a male member 1 and a female member 2. The male member 1 comprises a connecting portion 2 with a peripheral groove 3 and a wrench engaging portion 4 with internal threads 5 for engagement with a hose connection (not shown), and a flanged portion 6. The male member 1 also has an inner groove 7 and a reduced inner portion 8 for receiving a check valve 10 having a nose portion 11 with a groove 12 for receiving a washer 13 and a rear projecting portion 14 for receiving a stop member 15 and a spring member 16 for urging the washer 13 into sealing engagement with the flanged portion 6 of the male member 1 as shown in Fig. 4 when the male member 1 is disconnected from the female member 2. The female member 2 comprises a sleeve 20 having ball-retaining apertures 21, a threaded portion 22 for threadably engaging a stop member 23, an inner threaded portion 24 for receiving a hose connection (not shown), an inner groove 25 for receiving a U-shaped washer 26, an inner shoulder 27, an inner groove 28 for receiving a spring clip stop member 29, and an outer shoulder 30; and an outer movable sleeve 32 with a depending camming portion 33 and a spring member 34 for urging the movable sleeve 32 towards the stop member 23. A check valve 40 is disposed in the female member 2 in a movable sleeve 41 having an inner flange 42 and an outer flange 43, and a washer 44 adjacent the outer flange 43, and comprises a movable radially armed member 45 having a nose portion 46 with a groove 47 for receiving a washer 48, and a rear projecting portion 49 for receiving an inner spring member 50. An outer spring member 51 engages the outer flanged portion 43 of the sleeve 41. A spring restraining member 52 engages one end of the inner and outer spring members 50 and 51. The spring members 50 and 51 urge the washers 44 and 48 adjacent the flange 43 of the sleeve 41 and the radially armed member 45 into sealing engagement with the inner flanged portion 42 of the sleeve 41 and the inner shoulder 27 of the sleeve 41, as shown in Fig. 3, when the female member 2 is disengaged from the male member 1. Ball members 53 are disposed in the ball retaining apertures of the sleeve.

In operation the female member 2 is as shown in Fig. 3 with the check valve 40 and sleeve 41 in sealed relationship and the ball members 53 securely holding the movable sleeve 32 against the force of the spring 34. The connecting portion 2 of the male member 1 is inserted into the female member 2 moving the sleeve 32 longitudinally out of engagement with the ball members 53 and they are forced into engagement with the groove 3 in the connecting portion 2 of the male member 1 by the camming portion 33 of the sleeve 32 to lock the male and female members 1 and 2 together. The nose portion 11 of check valve 10 in the male member 1 engages the nose portion 46 of the check valve 40 to move the washers 13 and 48 away from the flanged portions 6 and 42 of the male member 1 and the female member 2.

When the outer sleeve 32 is moved against the force of the spring 34 to free the ball members 53 from engagement with the groove 3 in the connecting portion 2 of the male member 1 to disengage the male and female members 1 and 2, in the male member 1, the spring member 16 forces the washer 13 in the check valve 10 into engagement with the flanged portion 6 of the male member 1 to seal the male member 1; and in the female member 2, the washer 44 adjacent the flange 43 of the inner sleeve 41 and the washer 48 in the nose portion 46 of the check valve 40 is moved by the force of the springs 50 and 51 into engagement with the shoulder 27 and the flange 42 in the sleeve 41 of the female member 2 to seal the female member 2. In the longitudinal movement of the sleeve 32, the ball members 53 are forced outwardly to engage the camming portion 33 of the outer sleeve 32 to hold it in a position for ready engagement with the connecting portion 2 of the male member 1. Fig. 5 shows a male member 60 identical with the male member 1 shown in Figs. 1 and 4. The female member 61 is similar to the female member 2 shown in Figs. 1 and 3 but without U-shaped washer 25 and comprises a sleeve 62 having ball retaining apertures 63, a threaded portion 64 for threadably engaging a stop ring 65, an inner threaded portion 66 for receiving a threaded hose connection (not shown), an inner shoulder, and an inner groove 67 to receive a spring retaining clip member 68; and an outer movable sleeve 70 having a camming portion 71 and a spring member 72 for urging the sleeve 70 toward the stop member 65. Ball members 71 are disposed in the ball retaining apertures 63 to engage the groove 73 in the connecting portion 74 of the male member 60 to lock the male and female members 60 and 61 together.

An inner sleeve 75 disposed in sleeve 62 has an inner flange 76 and an outwardly extending flange 77 with a washer 78 adjacent thereto. A check valve 80 has a nose portion 81 with a groove 82 for receiving a washer 83 and a rearwardly extending portion 84 for receiving one end of an inner spring 85. An outer spring 86 engaging the sleeve 75 and the inner spring 85 have one end thereof held by a spring restraining member 87.

It will be evident that the operation of my novel coupling shown in Figs. 5 and 6 is identical with my novel coupling shown in Figs. 1, 2, 3, and 4. The only difference in construction is the absence of the washer 25, shown in Fig. 1.

From the foregoing, it will be seen that I have provided an effective and efficient ball-type coupler which may be connected by merely inserting a male member into a female member and which has effective check valves in both the male and female members for automatically sealing the male and female members when disconnected.

Various changes may be made in the specific embodiment of my present invention without departing from the spirit thereof, or from the scope of the appended claims.

What I claim is:

1. A coupling comprising a male member having a connecting portion with a groove; and a female member comprising a sleeve, camming members carried by said sleeve, and a spring-urged movable sleeve having a camming portion for holding said camming members in engagement with the groove in the connecting portion of said male member to lock said male and female members together; and a spring-urged inner sleeve having a flange portion adapted to hold said camming members in the path of the camming portion of said movable sleeve; and a spring-urged check valve, adapted to engage the flanged portion of said inner sleeve in sealing relationship.

2. A coupling as set forth in claim 1, wherein said camming members are ball members.

3. A coupling as set forth in claim 1, wherein a check valve is disposed in said male member adapted to move the check valve in said female member out of sealing relationship with the flanged portion of the inner sleeve of said female member when the male and female members are connected together.

4. A coupling comprising a male member having a connecting portion with a groove, a spring-urged check valve in said male member; a female member comprising a sleeve with ball retaining apertures, ball members in said apertures, an outer sleeve for holding said ball members in engagement with the groove in the connecting portion of said male member, an inner sleeve having an inner flange disposed in said sleeve of said female member, a check valve in said inner sleeve, a washer carried by said check valve adapted to engage the flanged portion of said inner sleeve, spring members for urging said check valve and inner sleeve longitudinally, said check valve and sleeve in said female member and check valve in said male member being movable longitudinally to an unsealed position when connected together freeing said ball members in the apertures of said sleeve of said female member to engage the groove in the connecting portion of said male member.

5. A coupling as set forth in claim 4, wherein said sleeve has an inner shoulder and said inner sleeve has an outer flange and a washer adjacent thereto adapted to sealingly engage the shoulder in said sleeve when said male and female members are disconnected.

6. A coupling comprising a male member having a connecting portion with a peripheral groove and an end flange, a check valve adapted to sealingly engage said flange in said male member when the male member is disconnected; a female member comprising a sleeve having ball retaining apertures, ball members in said apertures for locking engagement with the groove in the connecting portion of said male member to secure said male and female members together, a spring-urged outer sleeve for holding said ball members in locking engagement with said groove in the connecting portion of said male member, an inner flanged sleeve adapted to hold said ball members in the path of said spring-urged outer sleeve, when said male and female members are disconnected, and a check valve in said inner sleeve adapted to sealingly engage a portion of said inner flanged sleeve when said male and female members are disconnected.

7. A coupling as set forth in claim 6, wherein said sleeve has an inner shoulder and a washer is disposed adjacent a flanged portion of said inner sleeve to sealingly engage said shoulder when said female member is disengaged from said male member.

8. A ball-type coupling comprising a male member having a flanged connecting portion with a peripheral groove, a spring-urged check valve having a projecting nose portion adapted to engage the flanged connecting portion of said male member to seal said male member when disconnected; a female member comprising a sleeve having ball retaining apertures, ball members disposed in said apertures for engaging the peripheral groove in the connecting portion of said male member to secure said male and female members together, a spring-urged flanged inner sleeve adapted to hold said ball members in the path of said movable sleeve when said male and said female member is disconnected; a spring-urged check valve having a nose portion disposed in said inner sleeve for engaging said flanged inner sleeve to seal said female member when said male and female members are disconnected, said check valves and inner sleeve being moved longitudinally when said connecting portion of said male member is inserted into said female member to free said male and female member for the flow of fluid.

9. A coupling comprising a male member having a connecting portion with a peripheral groove; a female member comprising a sleeve having an inner shoulder, camming members carried by said sleeve for engaging the groove in the connecting portion of said male member to secure said male and female members together, an outer locking sleeve for locking said camming members in engagement with the groove in the connecting portion of said male member, a flanged sleeve for holding said camming members outwardly in the path of said locking sleeve when said male and female members are disconnected, longitudinally movable check valves disposed in said male and female members to seal them when disconnected and which are adapted to move to an unsealed position when they are connected together, and a sealing means between said inner shoulder of said sleeve and the flanged portion of said inner sleeve.

ALBERT T. SCHEIWER.

REFERENCES CITED

The following references are of record in the file of this patent:

UNITED STATES PATENTS

| Number | Name | Date |
|---|---|---|
| 2,092,116 | Hansen | Sept. 7, 1937 |
| 2,377,812 | Scheiwer | June 5, 1945 |
| 2,208,620 | Baisch | July 23, 1940 |
| 2,279,146 | Schneller | Apr. 7, 1942 |
| 2,299,193 | Trautman | Oct. 20, 1942 |